US008515468B2

(12) United States Patent
Karmarkar et al.

(10) Patent No.: US 8,515,468 B2
(45) Date of Patent: Aug. 20, 2013

(54) CALCULATION OF HIGHER-ORDER DATA FROM CONTEXT DATA

(75) Inventors: Sharada Karmarkar, Palo Alto, CA (US); Amit Karmarkar, Palo Alto, CA (US)

(73) Assignee: Buckyball Mobile Inc, Palo Alto, CA (US)

( * ) Notice: Subject to any disclaimer, the term of this patent is extended or adjusted under 35 U.S.C. 154(b) by 122 days.

(21) Appl. No.: 12/579,832

(22) Filed: Oct. 15, 2009

(65) Prior Publication Data

US 2010/0069103 A1  Mar. 18, 2010

Related U.S. Application Data

(63) Continuation-in-part of application No. 12/422,313, filed on Apr. 13, 2009, which is a continuation-in-part of application No. 11/519,600, filed on Sep. 11, 2006, now Pat. No. 7,551,935, which is a continuation-in-part of application No. 11/231,575, filed on Sep. 21, 2005, now Pat. No. 7,580,719.

(60) Provisional application No. 61/161,763, filed on Mar. 19, 2009.

(51) Int. Cl.
*H04W 4/14* (2009.01)

(52) U.S. Cl.
USPC .......................... 455/466; 370/328; 370/349

(58) Field of Classification Search
USPC ................................. 455/466; 370/328, 349
See application file for complete search history.

(56) References Cited

U.S. PATENT DOCUMENTS

| | | | |
|---|---|---|---|
| 4,959,785 A | 9/1990 | Yamamoto et al. | |
| 5,517,409 A | 5/1996 | Ozawa et al. | |
| 5,797,098 A | 8/1998 | Schroeder et al. | |
| 6,473,621 B1 | 10/2002 | Heie et al. | |
| 6,560,456 B1 | 5/2003 | Lohtia et al. | |
| 6,731,940 B1 | 5/2004 | Nagendran | |
| 6,785,869 B1 * | 8/2004 | Berstis | 715/210 |
| 6,813,507 B1 | 11/2004 | Gress et al. | |
| 6,816,578 B1 | 11/2004 | Kredo et al. | |
| 6,819,268 B2 * | 11/2004 | Wakamatsu et al. | 340/988 |
| 6,847,892 B2 * | 1/2005 | Zhou et al. | 701/213 |
| 6,963,839 B1 | 11/2005 | Ostermann et al. | |
| 6,964,020 B1 | 11/2005 | Lundy | |
| 6,966,035 B1 | 11/2005 | Suess et al. | |
| 6,990,333 B2 * | 1/2006 | Andrew et al. | 455/414.1 |
| 6,993,553 B2 | 1/2006 | Kaneko et al. | |
| 7,177,902 B2 | 2/2007 | Hubbard | |
| 7,207,004 B1 | 4/2007 | Harrity | |
| 7,254,773 B2 | 8/2007 | Bates et al. | |
| 7,272,406 B2 | 9/2007 | Chava et al. | |
| 7,293,074 B1 | 11/2007 | Jellinek et al. | |
| 7,305,230 B2 | 12/2007 | Zhigang | |

(Continued)

*Primary Examiner* — Lester Kincaid
*Assistant Examiner* — Diego Herrera

(57) ABSTRACT

Disclosed are a system, method and article of manufacture for calculation of higher-order data from context data are disclosed. An application program interface receives a set of context data in conjunction with a calculation module. A calculation module calculates a higher-order data using the set of context data. A signal-generation module embeds the higher-order data in a telecommunication signal. The calculation module may create a coordinate space for the set of context data. The calculation module may define a property of the coordinate space. The calculation module operates to define a function that describes a relation between each member of the set of context data.

18 Claims, 5 Drawing Sheets

(56) References Cited

U.S. PATENT DOCUMENTS

| | | | |
|---|---|---|---|
| 7,315,902 B2 * | 1/2008 | Kirkland | 709/247 |
| 7,366,500 B1 * | 4/2008 | Yalovsky et al. | 455/414.1 |
| 7,424,682 B1 | 9/2008 | Pupius et al. | |
| 2001/0029455 A1 * | 10/2001 | Chin et al. | 704/277 |
| 2002/0077135 A1 | 6/2002 | Hyon | |
| 2002/0173294 A1 | 11/2002 | Nemeth et al. | |
| 2002/0187794 A1 | 12/2002 | Fostick et al. | |
| 2002/0193996 A1 * | 12/2002 | Squibbs et al. | 704/260 |
| 2002/0198715 A1 | 12/2002 | Belrose | |
| 2003/0023424 A1 | 1/2003 | Weiner | |
| 2003/0078033 A1 | 4/2003 | Sauer et al. | |
| 2003/0085989 A1 * | 5/2003 | Tay | 348/14.02 |
| 2003/0125927 A1 | 7/2003 | Seme | |
| 2003/0144895 A1 | 7/2003 | Aksu et al. | |
| 2003/0186716 A1 | 10/2003 | Dorenbosch et al. | |
| 2003/0207701 A1 | 11/2003 | Rolnik et al. | |
| 2003/0236658 A1 | 12/2003 | Yam | |
| 2004/0024683 A1 | 2/2004 | Morciniec et al. | |
| 2004/0034561 A1 | 2/2004 | Smith | |
| 2004/0044517 A1 | 3/2004 | Palmquist | |
| 2004/0102201 A1 | 5/2004 | Levin | |
| 2004/0102956 A1 | 5/2004 | Levin | |
| 2004/0110493 A1 | 6/2004 | Alvarez et al. | |
| 2004/0122979 A1 | 6/2004 | Kirkland | |
| 2004/0158471 A1 | 8/2004 | Davis et al. | |
| 2004/0175114 A1 * | 9/2004 | Ando et al. | 386/69 |
| 2004/0179545 A1 | 9/2004 | Erola et al. | |
| 2004/0194141 A1 | 9/2004 | Sanders | |
| 2004/0215526 A1 | 10/2004 | Luo et al. | |
| 2004/0221256 A1 | 11/2004 | Martin et al. | |
| 2004/0221260 A1 | 11/2004 | Martin et al. | |
| 2004/0235503 A1 | 11/2004 | Koponen et al. | |
| 2004/0250212 A1 | 12/2004 | Fish | |
| 2004/0266462 A1 | 12/2004 | Chava et al. | |
| 2005/0003837 A1 | 1/2005 | Midkiff et al. | |
| 2005/0004840 A1 | 1/2005 | Wanninger | |
| 2005/0027608 A1 | 2/2005 | Wiesmuller et al. | |
| 2005/0038892 A1 | 2/2005 | Huang et al. | |
| 2005/0066044 A1 | 3/2005 | Chaskar et al. | |
| 2005/0128967 A1 | 6/2005 | Scobbie | |
| 2005/0171944 A1 | 8/2005 | Palmquist | |
| 2005/0191963 A1 | 9/2005 | Hymes | |
| 2005/0198304 A1 | 9/2005 | Oliver et al. | |
| 2005/0239518 A1 * | 10/2005 | D'Agostino et al. | 455/574 |
| 2005/0245241 A1 * | 11/2005 | Durand et al. | 455/414.1 |
| 2006/0067250 A1 * | 3/2006 | Boyer et al. | 370/260 |
| 2006/0135181 A1 | 6/2006 | Dale et al. | |
| 2006/0167992 A1 * | 7/2006 | Cheung et al. | 709/204 |
| 2007/0027673 A1 | 2/2007 | Moberg | |
| 2007/0076877 A1 | 4/2007 | Camp et al. | |
| 2007/0208813 A1 | 9/2007 | Blagsvedt et al. | |
| 2008/0059152 A1 | 3/2008 | Fridman et al. | |
| 2008/0133228 A1 * | 6/2008 | Rao | 704/231 |
| 2008/0171555 A1 * | 7/2008 | Oh et al. | 455/456.1 |

* cited by examiner

CALCULATION OF HIGHER-ORDER DATA FROM CONTEXT DATA

CLAIM OF PRIORITY

This application is a Continuation-in-part of and claims priority to patent application Ser. No. 12/422,313 filed on Apr. 13, 2009 which claims priority from Provisional Application 61/161,763 filed on Mar. 19, 2009, and is a Continuation-in-part of Ser. No. 11/519,600, filed Sep. 11, 2006, now U.S. Pat. No. 7,551,935, which is Continuation-in-part of Ser. No. 11/231,575, filed Sep. 21, 2005, now U.S. Pat. No. 7,580,719.

FIELD OF TECHNOLOGY

This disclosure relates generally to a communication system, and, more particularly, to a system, a method and an article of manufacture for calculating higher-order data from context data.

BACKGROUND

A user of a mobile device may compose a text message. The text message may refer to the context (e.g. an environmental condition, a historical event, another device within range of the mobile device, etc.) of the mobile device and/or the user. The mobile device may acquire information about the context and represent the information as context data. The mobile device may transmit both the text message and the context data to a server of a communications system. Other context data may be acquired by other devices in the communication system (e.g. the recipient's mobile device, a third-party server or a data base). The server may embed the context data into the text message before transmitting the text message to the recipient's mobile device. The recipient may find the context data useful in understanding the text message. However, in certain circumstances, additional information may be garnered through further analysis of the context data that the user may also find useful as well.

SUMMARY

A system, method, and article of manufacture for calculation of higher-order data from context data are disclosed. In one aspect, a system to calculate a higher-order context data from a context data is disclosed. The system includes a context data application program interface (API) operative to receive a set of context data. A calculation module operates to calculate a higher-order data using the set of context data. A signal-generation module operates to embed the higher-order data in a telecommunication signal. The context data API, calculation module and signal-generation module may reside in a server.

In addition, the calculation module may create a coordinate space for analysis of the set of context data. The calculation module may define a property of the coordinate space. The calculation module may also define a function that describes a relation between each member of the set of context data.

In another aspect, a computerized method of embedding a supplemental information in a text message is disclosed. A space with a specified set of properties is defined. A function is provided that relates a first contextual data variable with a second contextual data variable within the space. A supplemental information comprising the relationship between the first contextual data variable and the second contextual data variable is created. The supplemental information is embedded into a text message.

In addition, the method may include inputting a first contextual data value and a second contextual data value into the function. The supplemental information may be created with an output of the function. A supplemental information value may also be calculated using the function.

In yet another aspect, an article of manufacture comprising a computer-readable medium having stored there on a data structure is disclosed. A first field contains data representing a mathematical space with a specified set of properties and attributes. A second field contains data representing a function relating a first context data variable with a second context data variable. A third field contains data representing the first context data. A fourth field contains data representing the second context data.

In addition, a fifth field may contain data representing a supplemental information capable of being embedded in a text message. A sixth field may contain data representing another mathematical space with another specified set of properties and attributes. A seventh field may contain data representing another function relating a third context data variable with a fourth context data variable. An eighth field may contain data representing the third context data. A ninth field may contain data representing the fourth context data. A tenth field may contain data representing a function combining the mathematical space with the other mathematical space.

The system, method and article of manufacture disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Figure 1:
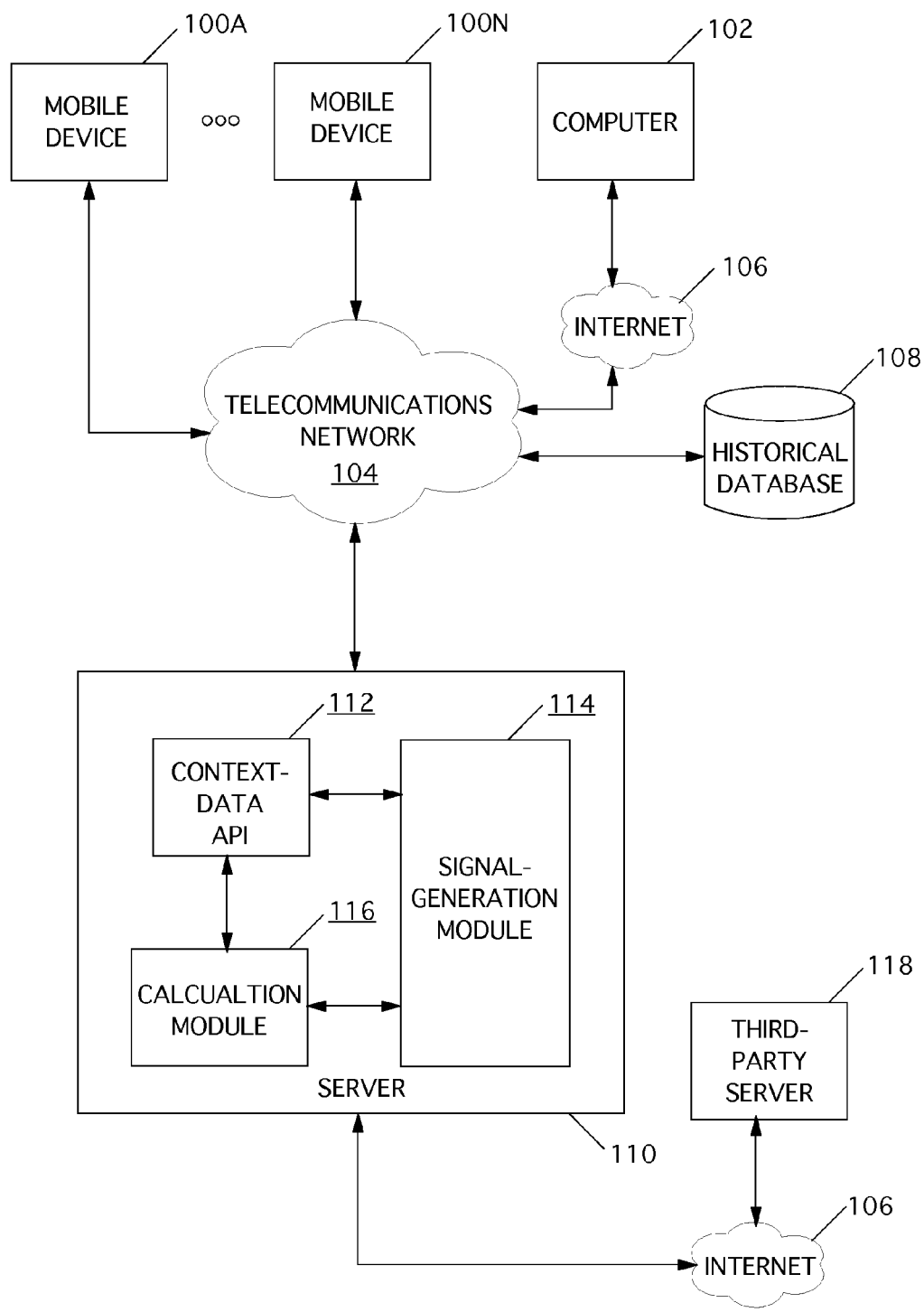
FIG. 1 illustrates a schematic diagram of a communications system, according to one embodiment.

Disclosed are a system, method, and article of manufacture for calculation of higher-order data from context data. Although the present embodiments have been described with reference to specific example embodiments, it will be evident that various modifications and changes may be made to these embodiments without departing from the broader spirit and scope of the various claims.

FIG. 1 illustrates, in part, a schematic diagram of a communications system, according to one embodiment. Particularly, the communications system of FIG. 1 includes peripheral devices such as the mobile devices 100A-B, the computer 102, the historical database 108 and the third-party server 118. These peripheral devices are communicatively coupled to a server 110. A peripheral device may couple with the server either via a telecommunications network 104 and/or the Internet 106.

The mobile devices 100A-N may include any handheld computing device capable of accessing the telecommunications network 104 (and in certain embodiments the Internet 106). The mobile device 100A-N may include such functionalities as cellular phone capabilities, Internet access and integrated context data capture devices. A context data capture device may acquire context data from the ambient environment of the mobile device 100A-N. Examples of context data capture devices include, inter alia, a bar code reader, a radio frequency identification (RFID) reader, a smart card reader and a barometer. The mobile device 100 A-N may include a system to encode the context data, integrate the context data into a text message and then transmit the context data to the server 118 via the telecommunications network 104. In other embodiments, the transmission of the context data may include an interval of transmission through the Internet 106. The text message and the encoded context metadata may be formatted according to any telephony protocol for transmission. In one embodiment, the text message is formatted according the short messaging service (SMS) standard. However, the text message (and the encoded context metadata) may also be formatted in any extension of the SMS standard (e.g. a multimedia messaging service (MMS) standard) for transmission as well.

In one embodiment, the mobile device 100A-N may transmit the text message and the encode context data to the server as a combined signal (e.g. an MMS signal). However, it should be noted that the text message and the encoded context data may also be transmitted at separate times (and, in certain example embodiments, from separate sources). For example, certain types of context data may be transmitted on a periodic basis to the server 118 by use of a control signal of the mobile device 100A-N. In another example embodiment, the server 110 may request a certain type of context data be acquired from a particular device (e.g. the third-party server 118). The particular device may then acquire and transmit the requested context data to the server 110.

The telecommunications network 104 may be a set of telecommunications links and nodes arranged so that messages may be passed from one part of the network to another over multiple links and through the various nodes. More particularly, the telecommunications network 104 may include a wide area network (WAN), a circuit/switch network and/or a cellular network interlinked for the transmission of data from a device (e.g. the mobile device 100 A-N, the third party server 118 or the historical data base 108) to the server 110.

In one embodiment, the computer 102 may be a general purpose computer functioning as a personal computing system. A user may access information from the server 118 via the Internet 106 and the telecommunications network 104 with the computer 102. For example, another user may use the mobile device 100A-N to send a text message and context data to the computer 102. The user of the computer 102 may also utilize the server 118 to acquire context data associated with the mobile device 100A-N. It is important to note that FIG. 1 illustrates a particular configuration of the communications system as other types of devices may be coupled with the communications systems of FIG. 1.

In another embodiment, the computer 102 may be a specialized computer designed to acquire and transmitted a limited set of context data types. For example, the computer 102 may be integrated into a particular type of sensor (e.g. a utility meter, a chemical sensor, a biometric medical device). The computer 102 may acquire the context data from the sensor. The computer 102 may then encode and transmit the context data to the server 110.

The server 106 may be a specialized application computing system capable of, inter alia, running applications to embed context data information in a text message and then transmit the text message to another receiving device (e.g. another server, another mobile device), according to one embodiment. The server 106 includes, inter alia, a context data API 112, a calculation module 116, and a signal generation module 114.

The context data API 112 serves as an interface within the server 110 for any context data from the telecommunications network 104 or the Internet 106. The context data API 112 may utilize a set of routines, data structures, object classes and/or protocols to allow the various forms of context data propagated by a device (e.g. the mobile device 100 A-N, the third party server 118 or the historical data base 108) to be utilized by the functionalities of the server 106.

The calculation module 116 uses context data to calculate a higher-order data, according to one embodiment. The calculation module 116 may use more than one type of context data from a variety of originating nodes within the communication system of FIG. 1. The calculation module 116 may also use other data (e.g. historical data, statistical data and previously calculated higher-order data) from other data sources to calculate the higher-order data. Other data sources may include the historical database 108, the interne 106 and the third-party server 118. The relationships between types of context data may be determined through the creation of coordinate spaces with specified attributes and properties. The context data may then be plotted within a particular coordinate space or set of coordinate spaces. In certain embodiments, the calculation module 116 may also combine more than one coordinate space to create a combined coordinate space. The calculation module 116 may then determine how the combined coordinate spaces interact. Functions may be determined that describe the various relationships between the different context data or the various coordinate spaces.

The calculation module 116 may utilize several methods to generate the higher-order data. For example, in one embodiment, the calculation module may create a coordinate space for plotting and modeling a particular set of context data. The coordinate space may be an n-dimensional space. In one embodiment, the coordinate space may be a computer-generated model (e.g. a data simulation). A continuous simulation language, a discreet simulation language or a hybrid simulation language may be utilized to model the coordinate space according to the particular requirements of the context data and/or coordinate space properties. The relationship between the context data with the coordinate space may be defined by a function. The function may calculate the behavior of the modeled system from a set of parameters and initial conditions. The calculation module 116 may analyze the behavior of the modeled system (as defined by the function) to generate the higher-order data. The calculation module 116 may also define the attributes and properties of the coordinate space. For example, in one example embodiment, the coordinate space may be a plot of data space with parallel or non-orthogonal coordinates.

In other example embodiments, the calculation module 116 may utilize a recursive function and/or recursive algorithm to generate the higher-order data. For example, the calculation module 116 may input a previously generated higher-order data into the recursive function to determine another higher-order data. This process step may be repeated n-times.

In another example embodiment, the calculation module 116 may utilize the content of the text message to generate the higher-order data. For example, the server 110 may decode, parse and analyze the content of a text message. Certain portions of the content may be mapped in the coordinate space and used to determine the function. In another example, the content may be assigned a value and input into the function that generates the higher-order data.

In one example, a first context data transmitted by a mobile device 100 A may be a location data. The location data may be derived by the server 110 from any environmental signal that provides information associated with a particular location (e.g. global positioning system (GPS) data, an identified local area network (LAN) within range of the mobile device 100 A, an accelerometer data, and a compass sensor data). The calculation module 116 may use successive location data to derive a direction vector of the mobile device 100 A. For example, the calculation module 116 may create a first coordinate space and plot the successive location data within the first coordinate space. A first direction vector may then be derived from the plot of the successive location data. A second direction vector of a mobile device 100 N may be calculated in a similar manner within a second coordinate space. The calculation module 116 may then create a third coordinate space and map the two direction vectors. The calculation module 116 may determine a function that shows the relationship between the two direction vectors within the third coordinate space. This function may be used to calculate the nearest point of proximity between the two mobile devices at a given time. In one embodiment, the vectors and the calculation may be dynamically revised at a periodic interval. For example, in one embodiment, the periodic interval may be based on the timing of the control signals of each mobile device.

In one embodiment, a fourth coordinate space may be created to plot the function used to derive the nearest point of proximity of the mobile devices 100 A and 100 N with the locations of a set of favorite restaurants of a user of the mobile device 100 A. The locations and list of the favorite restaurants may be provided by an index stored in the historical database 108. In one embodiment, the index may be derived from the user's participation in a social networking, user review, or local search web site (e.g. Yelp.com™). The calculation module 116 may then provide a function for determining a favorite restaurant within a specified distance of the nearest point of proximity between the two mobile devices 100 A and 100 N. The server 110 may then propagate an SMS text to each mobile device stating the name and location of the restaurant for the users to meet each other. In this example, the higher-order data includes the location of the favorite restaurant. The location of the favorite restaurant may be embedded as supplemental information with the SMS text. For example, a hyperlink to a web page with a map may be embedded within the SMS text. The hyperlink may be accessible with a web browser application of the mobile devices 100 A and 100 N. The server 110 may propagate additional SMS texts to each mobile device updating the name and location of the restaurant if the calculation module 116 determines that the nearest point of proximity of the mobile devices changes beyond a specified parameter.

The calculation module 116 may generate higher-order data in response in several possible circumstances. For example, in one embodiment, a user of the mobile device 100 A may communicate an SMS text message to another user of a mobile device 100 N stating "Let's meet". The server 110 may parse, decode and analyze the text message and determine a particular semantic meaning. The server 110 may then initialize the above described operation of the calculation module 116.

The possible types of context data should not be limited by the previous discussion of direction vectors. Other examples of possible context data are now described. In one embodiment, the mobile device may include a digital barometric pressure sensor (e.g. a BMP085 Digital Pressure Sensor™) constructed using micro-electro-mechanical systems (MEMS) technology. The barometric-pressure data may be included within the direction vector of the previous example embodiment. For example, if the user is in a building, the barometric-pressure data may be utilized by the calculation module to model the direction vector with an added vertical dimension. The time of descent to street level may then be calculated and factored into the function that generates nearest point of proximity between the two mobile devices at a given time.

Another source of context data includes a device to measure the value a force pressed against an input device of the mobile device 100 A-N, according to one embodiment. For example, the mobile device 100 A-N may include a touch screen capable of differentiating a level of force applied to a specified region of the touch screen. A user may photograph a room with a digital camera of the mobile device 100A-N. The user may press on certain regions in the digital display of the photograph according to the user's preference for an object displayed in the region. The image and the force values may be transmitted as context data to the server 110. The calculation module 116 may create a coordinate space and map the force values and region coordinates within the coordinate space. The calculation module 116 may determine a function describing the relationship between the force values and region coordinates. The calculation module 116 may determine a higher-order data using the function.

In another example, a user may set the settings of the server 110 to associate a range of parameters of the pressing force with certain meanings. For example, a lower range of pressing force may indicate affection. A higher range of pressing force may indicate an emergency. For example, the user may input a text message "I need you." The user may press on the touch screen of the mobile device 100 A with a pressing force within the lower range to indicate affection. The mobile device 100 A may generate a pressing-force value context data. The mobile device 100A may transmit the pressing-force value context data to the server 110. The calculation module 116 may create a coordinate space and map the pressing-force value and the range of parameters of the pressing force that are associated with the specified meanings. The calculation module 116 may determine that the user indicated affection by analyzing the mapped coordinate space. The indication of affection is then encoded and embedded in a telecommunications signal. The settings of the receiving device may be set to display a visual symbol (e.g. an emoticon) or digital image (e.g. a photo of the sending user) when the embedded signal associated with affection is received.

In another example embodiment, a party may monitor the environmental conditions of the mobile device 100 A. The mobile device 100 A may include devices for the measurement of environmental conditions (e.g. a barometer, a thermometer). The mobile device 100 A may periodically transmit an environmental context data to the server 110. The calculation module 116 may create a coordinate space and plot the values of the environmental context data over a period of time. The calculation module 116 may also plot a set of predefined parameters for the environmental context data. The calculation module 116 may determine a function for relating the environmental context data with the parameters. The signal generation module 114 may generate an alert signal if the function yields a value above a pre-defined threshold limit. The alert signal may then be automatically transmitted by the server 110 to a set of receiving devices (e.g. cell phones of supervisors, governmental agency computers).

In another example, the mobile devices 100 A-N may include a gyroscope. A user of the mobile device 100A may view a hologram from a series of orientation angles. The Orientation context data may then be communicated to the server 110. The user of mobile device 100N may then view the same hologram. The user of mobile device 100N may want to view the hologram from the same series of orientation angles as the user of mobile device 100A. Orientation context data of mobile device 100N may also be transmitted to the server 110. The calculation module 116 may create a coordinate space and map the orientation context data of mobile device 100A and the orientation context data of mobile device 100N. The calculation module 116 may create a function that compensates for the difference between the two orientation angles. The signal generation module may generate a hologram control signal. The hologram control signal may be transmitted to the mobile device 100N. The hologram control signal may then calibrate the hologram to an angle of orientation that compensates for the difference between the orientation of mobile device 100A and the orientation context data of mobile device 100N. Consequently, the user of mobile device 100N may be able to view the hologram at the same angle of orientation as the user of mobile device 100A.

In another example, a digital image (or video) of an object may be obtained with a digital camera in the mobile device 100A. The mobile device 100A may include a light sensor device. The digital image may be transmitted to the mobile device 100N via an MMS standard. The light sensor data may be communicated to the server 110 as context data. The mobile device 100N may include a light sensor device. Context data from the light sensor device of mobile device 100N may also be transmitted to the server 110. The calculation module 116 may map the light sensor data of the two devices. The calculation module 116 may then determine a function for calibrating the brightness of the display of mobile device 100N such that the digital image is presented with the effect of substantially the same light conditions as the digital image was obtained. The signal generation module 114 may generate a brightness control signal for calibrating the brightness of the display of the mobile device 100N to the value output by the function.

In another example, the computer 102 may be a computing device located in or coupled to an appliance. The computer 102 may provide status updates in the form of context data regarding the appliance's state or the appliance's environment. In this example, the computer 102 may also be communicatively coupled directly with the telecommunications network as well (not shown in FIG. 1). For example, the appliance may a traffic light. The computer 102 may transmit a status update of the traffic light to a server 110 describing the status of the traffic light (e.g. working properly, malfunctioning). The server 110 may process the status update with the calculation module 116. The mobile device 100 A of a subscribing user (e.g. a maintenance officer) may receive a status update of the appliance. For example, should the traffic light malfunction, a text will be sent to the mobile device 100 A informing the user of the malfunction. Other appliances may be associated with the above appliance. For example, the traffic light's intersection may also include one or more traffic cameras. Video context data collected by the traffic cameras may be transmitted to the server 110. The video context data may be processed by the calculation module 116 with the traffic light status context data. Additional context data (e.g. including, road closure information context data transmitted from a regional traffic authority server, roads under construction context data transmitted from a regional traffic authority server, GPS location context data transmitted from a sender's mobile device 100 B, GPS location context data transmitted of recipient's mobile device 100 N and accelerometer context data from the recipient's mobile device 100 N) may be transmitted to the server 110 to be used in the calculation of the higher-order data. For example, the calculation module 116 may use this information to calculate an estimated time of arrival the text message receiver. Accordingly, a recipient's mobile device 100 N may receive a text message generated by the server 100 stating an estimated time of arrival for the recipient's mobile device 100 N.

In another example embodiment, a set of appliances, each with a computer 102, may be located in a laboratory. The user of mobile device 100 A may have preset a specified text message to initiate a series of context data acquisition operations to be performed by the mobile device 100 A and the appliances located in the laboratory. For example, the specified text message may be "help me". The server 110 may receive the text message and transmit a control signal to the mobile device 100 A and the appliances. One appliance may include a gas and a temperature sensor. A computer 102 coupled to the appliance may transmit gas context data and temperature context data. The calculation module 116 may use the gas context data and temperature context data to determine that a gas leak and a fire are extant in the laboratory. The server 110 may transmit a control signal to the mobile device 100 A to return a GPS location context data along with other pertinent context data (e.g. biometric context data, WIFI context data). The calculation module 116 may determine that the mobile device 100 A is in a certain proximity to the gas leak and the fire. The serve 110 may then transmit an emergency plan initiation text message to the appropriate government agency along with gas leak, fire, mobile device 100 A information and status of the user.

Figure 2:
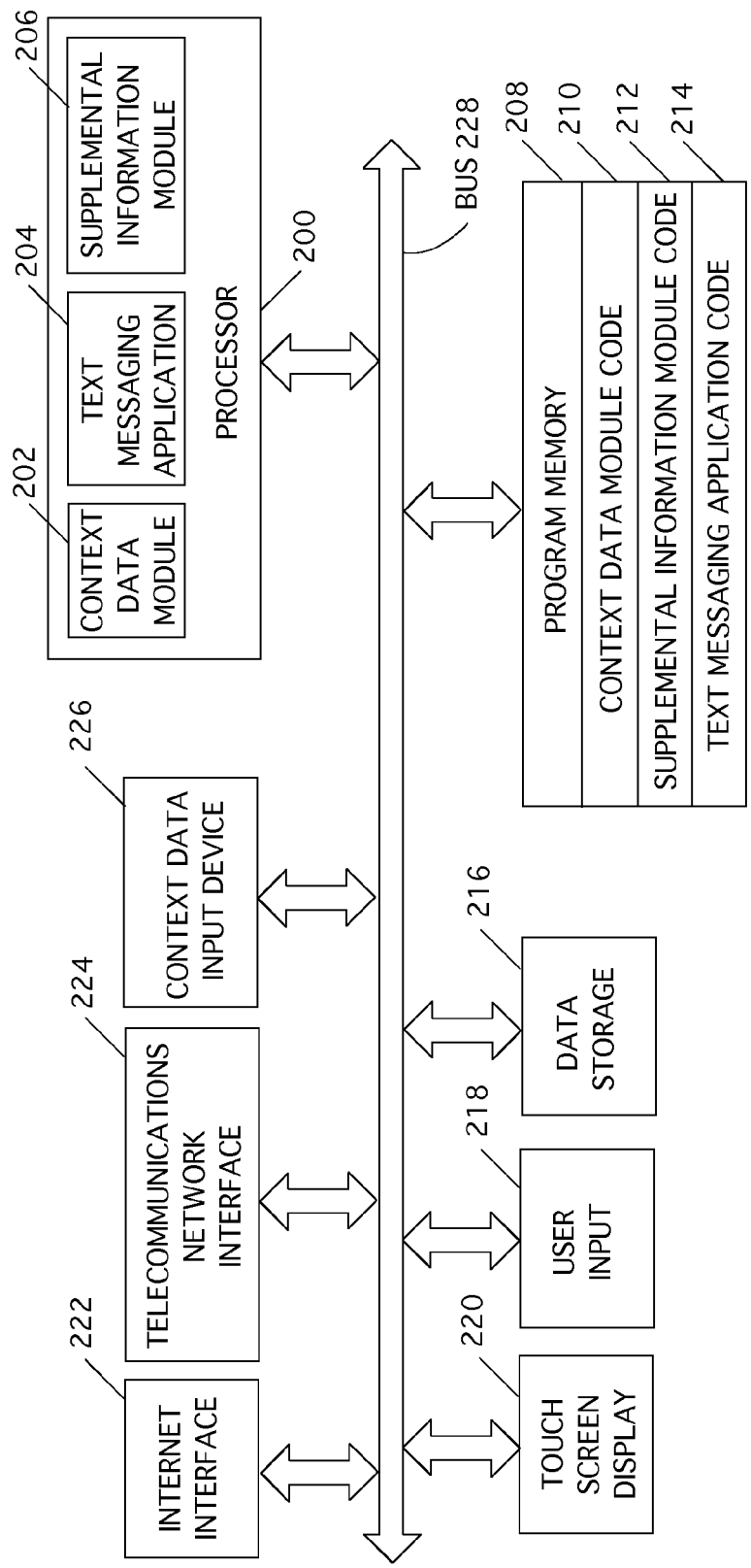
FIG. 2 illustrates the physical structure and code structure of a mobile device of the communications system, according to one embodiment.

FIG. 2 illustrates the physical structure and code structure of the mobile device 100 A-N of the communication system according to one embodiment. The context data module 202, text messaging application 204 and the supplemental information module 206 have been loaded into the processor 200. The program memory 208 may be any type of memory device (e.g. volatile or non-volatile memory). The context-data module code 210, the supplemental information module code 212 and the text messaging application code 214 are shown as stored in the program memory 208.

The context data module 202 may be a software functionality that uses the context data input device 226 to gather, store and transmit context data. Context data may be, inter alia, a device that acquires information from an environmental, historical data memory source or internal memory source (e.g. the program memory 208 or the data storage 216). The context data module 202 may then encode the information in digital form. The context data module 202 may manage the transmission of the context data to the server 110. The context data module 202 may embed the context data in a text message (i.e. encode the context data into the telecommunications protocol of the text message and transmit both the text message and the encoded context data together). The context data module 202 may also asynchronously transmit the context data to the server at periodic intervals independent of a text message transmission. The context data module 202 may transmit the context data via a data communication network (e.g. via a 3G wireless data connection to the Internet) to the server 110.

The text messaging application 204 may be an application that supports text messaging functionalities. For example, the text messaging application 204 may support both SMS and MMS standards in the mobile device 100 A-N.

The supplemental information module 206 may include a software functionality to parse, decode and analyze and incoming context data. The supplemental information module 206 may display the context data in a form pertinent to the type of context data. For example, if the context data is a hyperlink to a map. The supplemental information module 206 may display a portion of the text as bold to indicate to the user that pressing the bold text will activate the hyperlink.

The user input 218 may be any input device of the mobile device 100 A-N (e.g. a key pad, a microphone, a scroll ball). The touch screen display 220 may be a display that can detect the presence and location of a touch within the display area. The internet interface 222 may be a device used to interface the mobile device 100 A-N with the Internet 106. The telecommunications network interface 224 may allow the mobile device 100 A-N to communicate with the telecommunications network 104. The telecommunications network interface 224 may include a radio frequency antennae and transceiver. The bus 228 may be a subsystem that transfers data between components of the mobile device 100 A-N.

Figure 3:
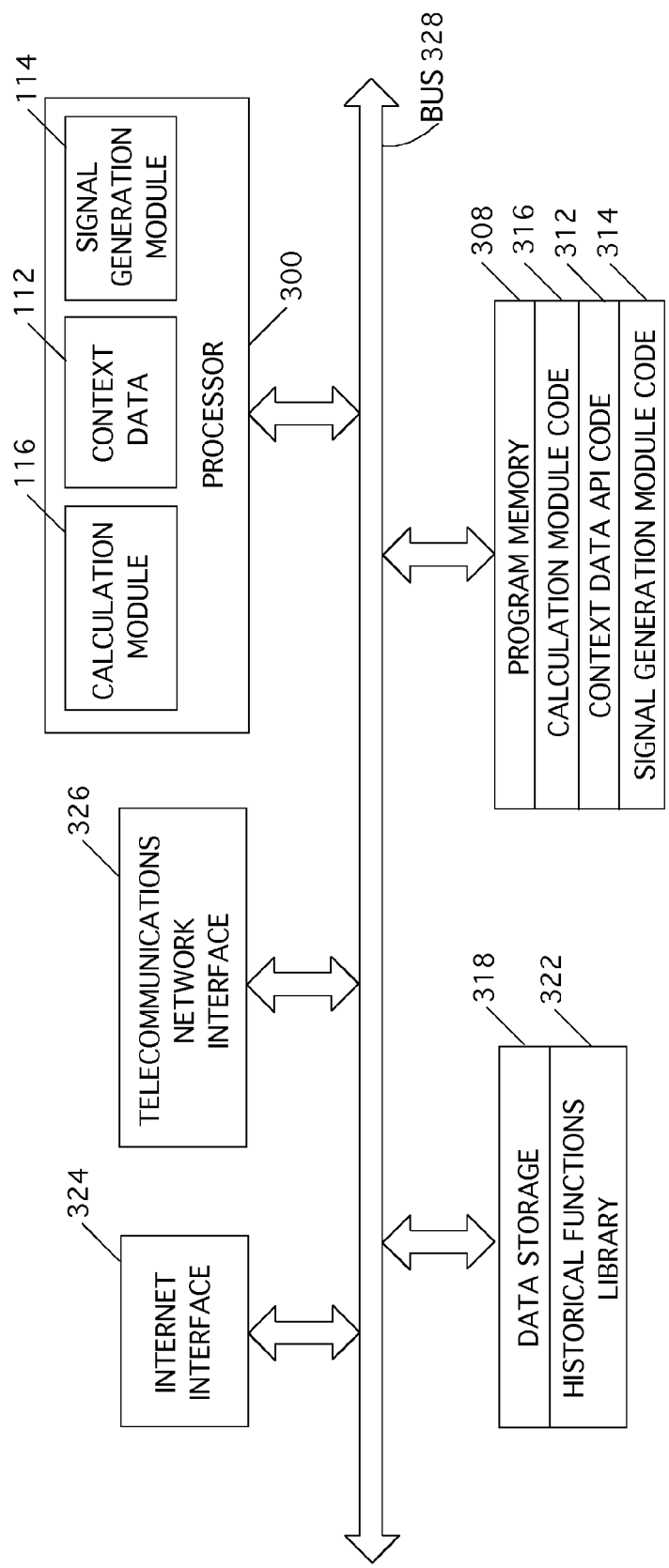
FIG. 3 illustrates the physical structure and code structure of a server of the communications system, according to one embodiment.

FIG. 3 illustrates the physical structure and code structure of the server 110 of the communication system, according to one embodiment. The calculation module 116, the context data API 112 and the signal generation module 114 have been loaded into the processor 300. The program memory 308 may be any type of memory device. The calculation module code 316, the context data API code 312 and the signal generation module code 314 are shown as stored in the program memory 308.

The digital storage 318 may be a form of secondary storage (e.g. a disk drive) that includes a non-volatile memory. The historical coordinate space library 320 may include a database of coordinate spaces that have been previously modeled by the calculation module 116. The coordinate spaces may be associated with specific devices of the communications system. The historical functions library 322 may include a database of functions defining the relationships between context data with certain spaces. The Internet interface 324 may be a device used to interface the server 110 with the Internet 106. The telecommunications network interface 326 may allow the server 110 to communicate with the telecommunications network 104.

Figure 4A:
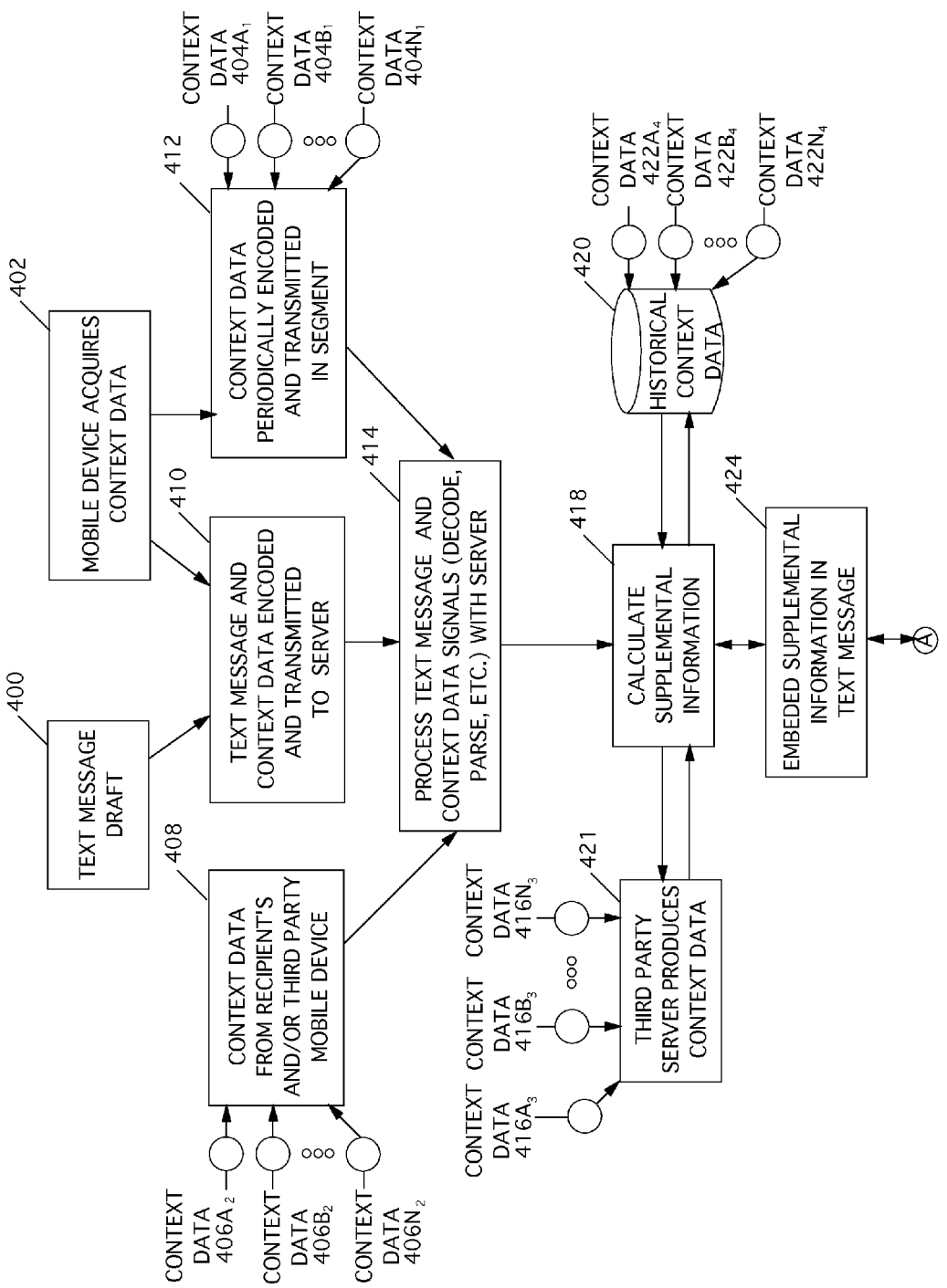
FIG. 4A illustrates an example of the functioning of the communications system, according to one embodiment.
Figure 4B:
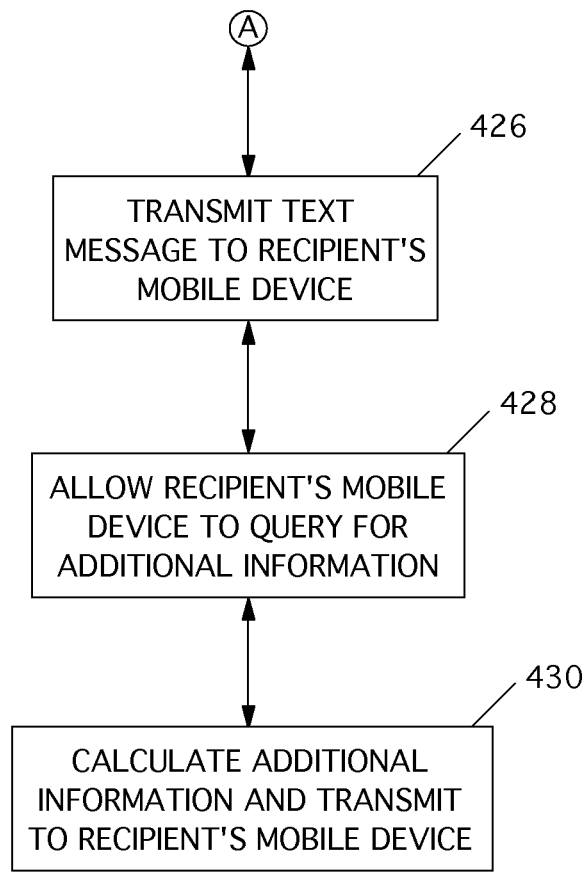
FIG. 4B continues the illustration of the example of the functioning of the communications system of FIG. 4A, according to one embodiment.

FIG. 4A illustrates an example of the functioning of the communications system of FIG. 1. In operation 400, a text message is drafted by a user (e.g. using user input 218 and the text messaging application 204). In operation 402, the mobile device 100 A-N acquires context data 404 $A_1$-$N_1$ (e.g. using context data input device 226). In operation 410, the text message and the context data are encoded and transmitted to the server 110 (e.g. via either the telecommunications network 104 and/or the Internet 106). In one embodiment, the context data module 202 may be utilized to perform operation 410. In operation 412, context data acquired by the mobile device 100 A-N may also be periodically encoded and transmitted to the server 110 independent of a text message. In operation 408, a context data 406 $A_2$-$N_2$ may be acquired by a recipient's mobile device and/or other third party devices. The context data 406 $A_2$-$N_2$ may then be encoded and transmitted to the server 110. In operation 414, the server 110 processes (e.g. parse, decode, analyze, etc.) the text message and context data signals. In operation 418, the calculation module 116 calculates supplemental information using the context data. In an example embodiment, the text message may also be used to calculate the supplemental information. The calculation module 116 may include the context data 416 $A_3$-$N_3$ acquired from a third-party server 118. The calculation module 116 may request the context data 416 $A_3$-$N_3$ from a third-party server 118. The calculation module 116 may also include the context data 422 $A_4$-$N_4$ acquired from a database with historical context data 420. In operation 421, the third-party server 118 transmits context data $A_4$-$N_4$ to the server 110. The database with historical context data 420 may be in the server 110 or in other devices of the communications system. In operation 424, the supplemental information (e.g. a higher-order data) is embedded in the text message (e.g. using the signal generation module 114). It is noted that in other embodiments, the supplemental information may be transmitted without being embedding in the text message. In operation 426, the text message is transmitted to a recipient's mobile device. The recipient's mobile device may query the server 110 for additional information (e.g. a hypertext document, another higher-order data) in operation 428. In operation, 430, the server 110 may calculate additional supplement information or acquire the requested information from a third-party server 118 or the historical database 108 (e.g. using the supplemental information module 206). The server 110 then transmits the requested information to the receiver's mobile device. In other embodiments, the receiving device may be a personal computer, another server or even a database.

Although the present embodiments have been described with reference to specific example embodiments, it will be evident that various modifications and changes may be made to these embodiments without departing from the broader spirit and scope of the various embodiments. For example, the various devices, modules, etc. described herein may be enabled and operated using hardware circuitry (e.g., CMOS based logic circuitry), firmware, software or any combination of hardware, firmware, and software (e.g., embodied in a machine readable medium).

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A system for calculating a higher-order context data from a context data comprising:
   a sensor operative to obtain a set of context data;
   a text messaging application operative to provide a user-generated short message service (SMS) message or a user-generated multimedia message service (MMS) message and to transmit the message to a receiving device, and wherein the SMS message or the MMS message comprises a reference to an environmental attribute of a mobile device;

an application program interface operative to automatically obtain a set of context data, wherein the set of context data comprises automatically obtained measurements of at least one environmental attribute of the mobile device;
a calculation module operative to automatically calculate to higher-order data, with at least one processor, using the set of context data, wherein the context data comprises an information describing an environmental attribute of a mobile device, wherein the higher-order data is calculated by plotting first context-data represented as a first vector in a coordinate space, plotting a second context-data as second vector in the coordinate space and determining a relation between the first vector and the second vector, and wherein the higher-order data comprises the relation; and
a signal-generation module operative to automatically embed the higher-order data in the user-generated SMS message or the user-generated MMS message and to transmit the message to a receiving device.

2. The system of claim 1,
wherein the calculation module operates to create a coordinate space for analysis of the set of context data, and
wherein the calculation module operates to define a property of the coordinate space.

3. The system of claim 2, wherein the calculation module operates to define a function that describes a relation between each member of the set of context data.

4. The system of claim 1,
wherein the calculation module operates to define a first coordinate space for a first context data type and a second coordinate space for a second context data type, and
wherein the calculation module operates to define an inter-spatial function that describes a relation between the first coordinate space and the second coordinate space.

5. The system of claim 4, wherein the set of context data is received from a chemical sensor coupled with the mobile device.

6. The system of claim 4, wherein the set of context data is received from a biometric medical device coupled with the mobile device.

7. A method of embedding a supplemental information in a text message, comprising the steps of:
obtaining a user-generated text message;
automatically selecting a space with a specified set of properties;
automatically obtaining a first context data derived from a sensor of a mobile device, wherein the first context data comprises an environmental condition of the mobile device referred to in the user-generated text message;
mapping, with at least one processor, the first context data in the space;
automatically obtaining a second context data from the sensor or another sensor of the mobile device;
mapping the second context data in the space;
relating a first context data represented within the space with a second context data represented within the space;
automatically creating a supplemental information comprising the relationship between the first context data and the second context data; and
automatically embedding the supplemental information into a the user-generated text message.

8. The method of claim 7 further comprising:
inputting a first contextual context data value and a second contextual context data value into a function.

9. The method of claim 8 further comprising:
creating the supplemental information with an output of the function.

10. The method of claim 7 further comprising:
selecting another space with another specified set of properties; and
providing another function that relates a third context data represented within the other space with a fourth context data represented within the other space.

11. The method of claim 10, further comprising:
combining the space and the other space to create a combined space.

12. The method of claim 7, further comprising:
deriving a first direction vector from at least two location data of the mobile device;
mapping the direction vector in the space;
deriving a second direction vector from at least two location data of the mobile device;
mapping the second direction vector in the space; and
wherein the supplemental information comprises the relationship between the first direction vector and the second direction vector.

13. The method of claim 7, wherein the context data comprises an information describing an environmental attribute of a mobile device.

14. The method of claim 8, wherein the environmental attribute comprises at least one of a context data derived from a pressure sensor, a temperature context data, a barometric pressure context data, a humidity context data, an accelerometer context data, a gyroscope context data, a global positioning system (GPS) context data and an ambient light context data.

15. The method of claim 14,
wherein the first context data variable comprises a GPS context data variable,
wherein the second context data variable comprises an accelerometer context data variable, and
wherein the function relates the GPS context data variable with the accelerometer context data variable.

16. A computerized method of embedding a supplemental information in a text message, comprising the steps of:
selecting a space with a specified set of properties;
automatically obtaining a first context data derived from a sensor of a mobile device, wherein the
sensor obtains information about an environmental attribute of the mobile device;
mapping the first context data in the space;
automatically obtaining a second context data from another sensor of another mobile device;
mapping the second context data in the space;
automatically relating a first context data represented within the space with a second context data represented within the space;
creating a supplemental information comprising the relationship between the first context
data and the second context data; and
embedding the supplemental information into a text message.

17. The method of claim 16, further comprising:
deriving a first direction vector from at least two location data of the mobile device;
mapping the direction vector in the space;
deriving a second direction vector from at least two location data of the other mobile device;
mapping the second direction vector in the space; and
wherein the supplemental information comprises the relationship between the first direction vector and the second direction vector.

18. The method of claim 16 wherein the sensor comprises a chemical sensor and the other sensor comprises another chemical sensor.

* * * * *